(12) United States Patent
Petermann

(10) Patent No.: US 8,191,271 B2
(45) Date of Patent: Jun. 5, 2012

(54) GEODETIC APPARATUS

(75) Inventor: Marco Petermann, Grossolbersdorf (DE)

(73) Assignee: Trimble Jena GmbH, Jena (DE)

( * ) Notice: Subject to any disclaimer, the term of this patent is extended or adjusted under 35 U.S.C. 154(b) by 349 days.

(21) Appl. No.: 12/692,424

(22) Filed: Jan. 22, 2010

(65) Prior Publication Data
US 2010/0186245 A1 Jul. 29, 2010

Related U.S. Application Data

(63) Continuation of application No. PCT/EP2007/057659, filed on Jul. 25, 2007.

(51) Int. Cl.
*G01C 1/02* (2006.01)
(52) U.S. Cl. ............................... 33/299; 33/290; 74/425
(58) Field of Classification Search .............. 33/275 R, 33/286, 290, 291, 299
See application file for complete search history.

(56) References Cited

U.S. PATENT DOCUMENTS

| 1,953,804 | A | | 4/1934 | Hayes |
| 5,887,353 | A | | 3/1999 | Beckingham |
| 5,987,763 | A | * | 11/1999 | Ammann et al. ............... 33/290 |
| 6,076,266 | A | | 6/2000 | Beckingham et al. |
| 6,643,940 | B1 | | 11/2003 | Donath et al. |
| 2004/0237689 | A1 | | 12/2004 | Hiltbrand |
| 2010/0275454 | A1 | * | 11/2010 | Tippett et al. ................... 33/228 |
| 2011/0001986 | A1 | * | 1/2011 | Westermark .................... 33/365 |

FOREIGN PATENT DOCUMENTS

| CH | 263 691 A | 9/1949 |
| DE | 295 03 919 U1 | 4/1995 |
| JP | 04-138311 A | 5/1992 |

OTHER PUBLICATIONS

International Search Report and Written Opinion of PCT Application No. PCT/EP2007/057659 mailed Apr. 17, 2008, 12 pages total.

* cited by examiner

*Primary Examiner* — G. Bradley Bennett
(74) *Attorney, Agent, or Firm* — Kilpatrick Townsend & Stockton LLP

(57) ABSTRACT

A geodetic apparatus, in particular tacheometer or theodolite, comprises an optical device for sighting objects, a first support on which the optical device is supported such that the optical device may turn around a first axis, and a first gear unit for transmitting a drive torque on the optical device so as to turn the optical device around the first axis. In thegeodetic apparatus, the first gear unit comprises a worm and a worm gear meshing with each other, wherein the worm has a plate-like body and a spirally extending worm thread is formed on a first side face of the body, and the worm gear has a plurality of teeth evenly distributed along a circle.

17 Claims, 5 Drawing Sheets

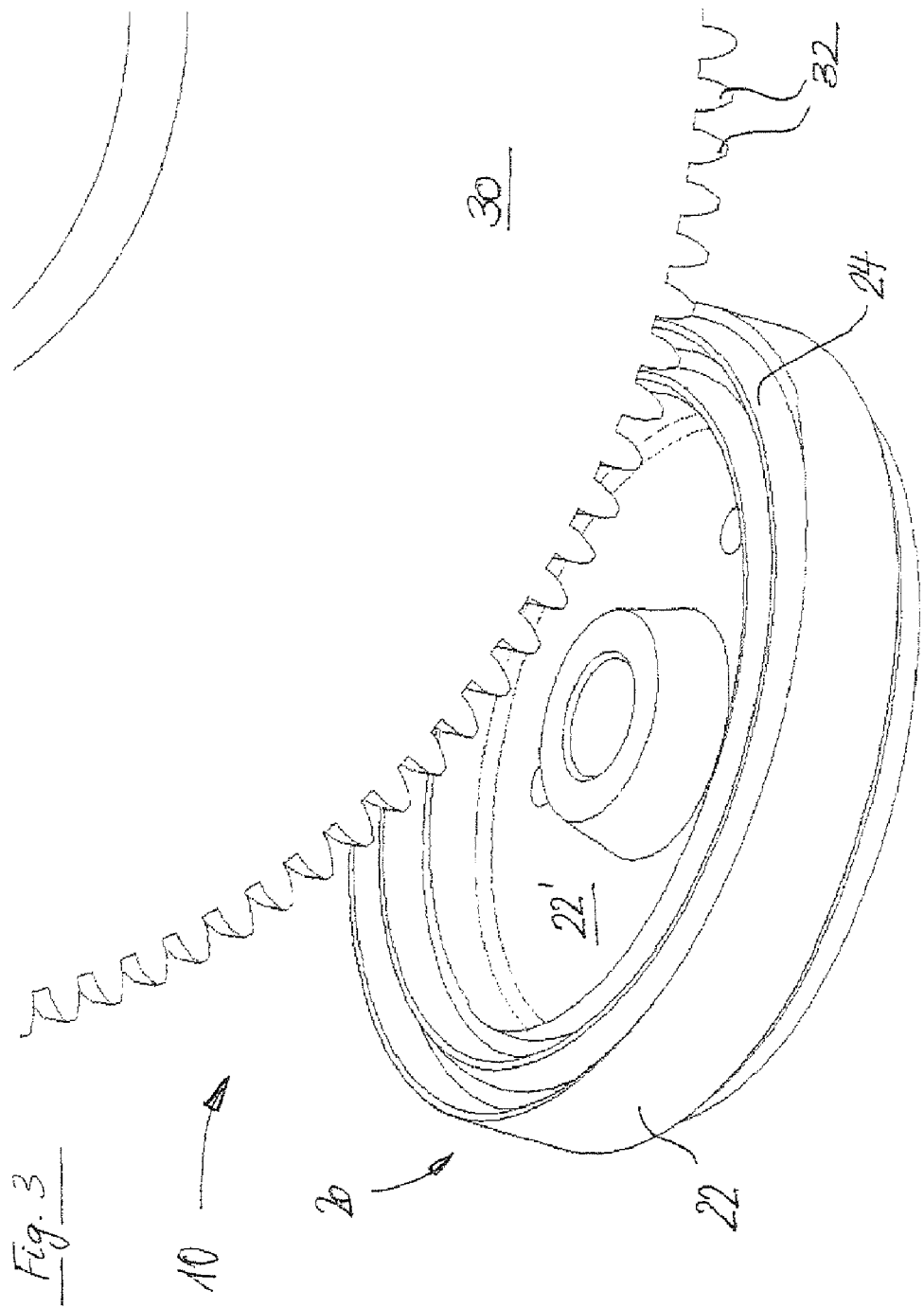

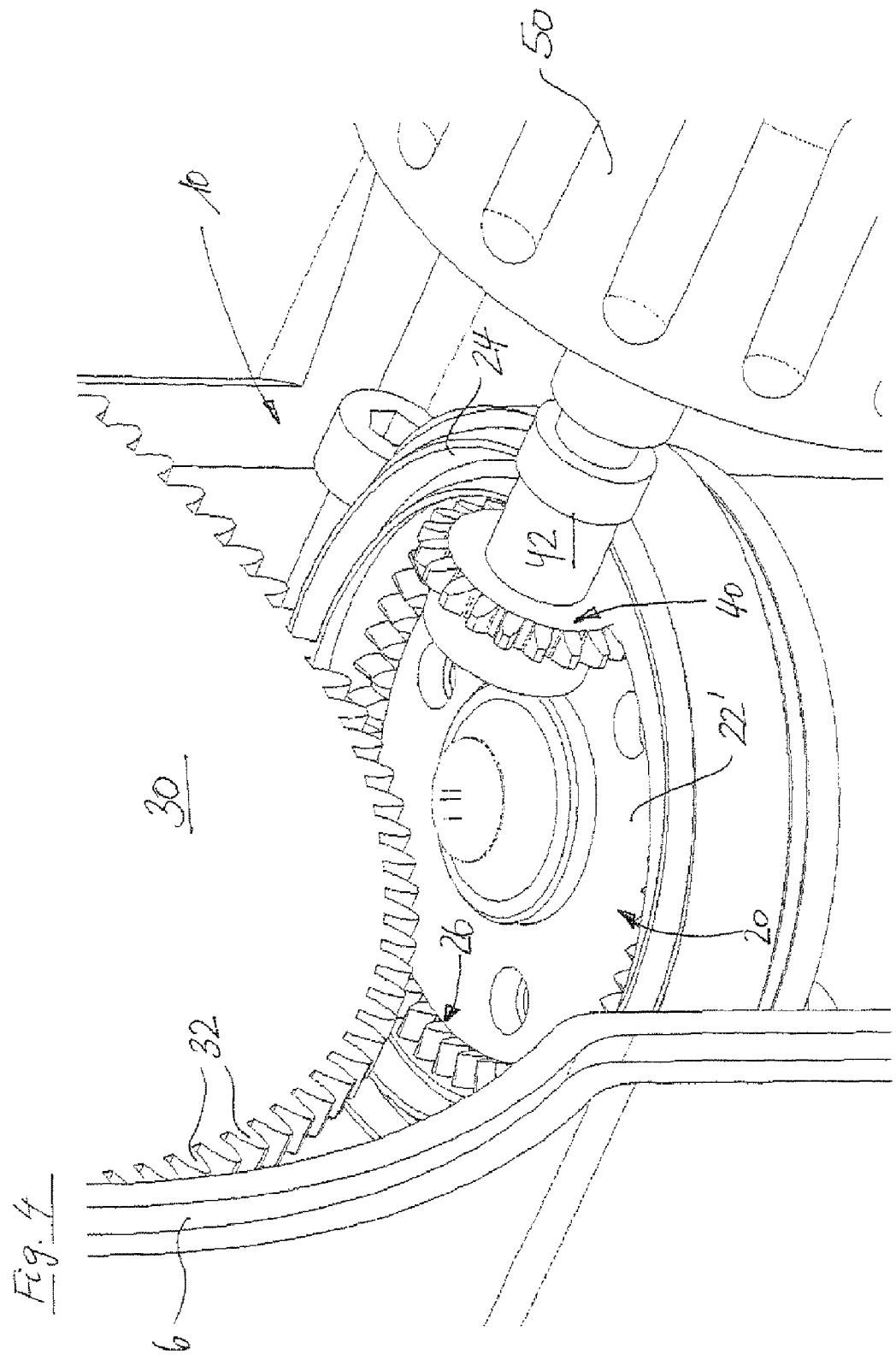

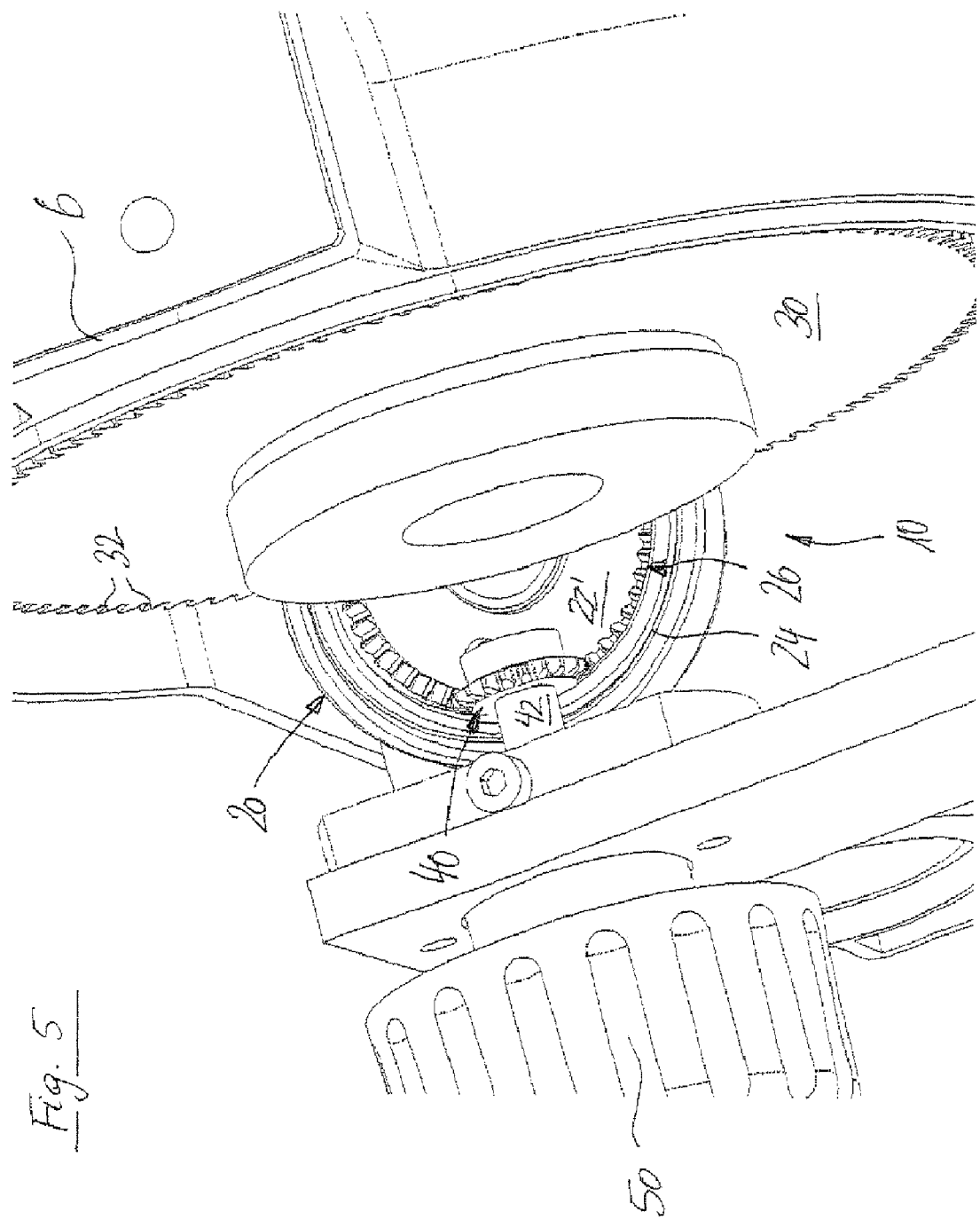

GEODETIC APPARATUS

CROSS-REFERENCES TO RELATED APPLICATIONS

This application claims priority to and is a continuation of International Patent Application PCT/EP2007/057659, filed on Jul. 25, 2007, entitled "Geodetic Apparatus," the contents of which is hereby incorporated by reference in its entirety.

BACKGROUND OF THE INVENTION

The present invention generally relates to a geodetic apparatus, in particular a tacheometer or a theodolite.

A geodetic apparatus such as a tacheometer or theodolite is generally used for sighting or focusing objects and for determining their (relative) position. For this purpose, a geodetic apparatus generally comprises an optical device for sighting or focusing said objects, for instance a lens, telescope, camera or the like.

In the geodetic apparatus, the optical device is supported such that it may turn around a first axis so as to aim at an object. For turning and adjusting the optical device, various adjustment means are known in the art. For instance, U.S. Pat. No. 6,643,940 generally discloses a device for horizontal and vertical adjustment in geodetic devices comprising fine adjustment gear units each having a worm and a worm gear with a friction clutch. While this device generally works properly, it requires parts which are relatively complicated to manufacture such as the worm.

Further, DE 295 03 919 U discloses an adjustment device in a geodetic apparatus comprising a fine adjustment lever. Said fine adjustment lever has arranged thereon several teeth which are aligned on a straight line. Said teeth mesh with a drive element having a planar thread. Further, the fine adjustment lever is connected with an axis of an optical element to be adjusted via a clamping mechanism. If the optical element is to be adjusted in a wide range of angles, the clamping mechanism is released so as to turn the optical element. Subsequently, the clamping mechanism is tightened and the orientation of the optical element is fine adjusted using the fine adjustment lever. Thus, the known adjustment device has a complicated construction including a large number of parts and requires several steps for achieving an adjustment of the optical device in a wide range.

SUMMARY OF THE INVENTION

It is therefore desirable to provide for a geodetic apparatus that allows a precise adjustment of an optical device in a wide range while having a simple construction and being easy to manufacture.

According to an embodiment a geodetic apparatus, in particular tacheometer or theodolite, comprises an optical device for sighting objects, a first support on which the optical device is supported such that the optical device may turn around a first axis, and a first gear unit for transmitting a drive torque on the optical device so as to turn the optical device around the first axis, wherein the first gear unit comprises a worm and a worm gear meshing with each other, wherein the worm has a plate-like body and a spirally extending worm thread is formed on a first side face of the body, and the worm gear has a plurality of teeth evenly distributed along a circle. Accordingly, the geodetic apparatus provides a full range of adjustment without additional parts such as fine adjustment levers, clamping mechanisms, etc. Further, the main parts of the geodetic apparatus of the embodiment are easy to manufacture or even commercially available. Still further, the combination of a worm having a plate-like body and a spirally extending worm thread formed on a first side face of the body with a worm gear having a plurality of teeth evenly distributed along a circle allows for a large degree of freedom in arranging the components of the first gear unit.

According to an advantageous example, the axis of the worm and the worm gear are non-parallel, preferably perpendicular to each other. This allows a completely new arrangement of the first gear unit in which a drive mechanism for the first gear unit can be placed in a compact manner.

Within the present invention, the worm gear can be formed in many different ways such as a spur gear. However, according to another advantageous example the worm gear comprises a pinion gear. This allows a smooth and low friction operation of the first gear unit and is advantageous for achieving a perpendicular arrangement of the worm and the worm gear to each other.

According to another advantageous example the worm thread of the worm extends in a single plane. In this way, inner friction forces of the first gear unit can be kept low while the worm thread has a simple construction.

According to another advantageous example the worm thread spirally extends by at least 360°. This allows a wide range of fine adjustments even if a high gearing ratio is selected.

The worm and the worm gear can be manufactured in any different ways. According to an advantageous example, however, the worm is at least partially made of a plastic material, preferably by injection molding. In this way, the manufacture of the geodetic apparatus can be further simplified since the worm can be produced without expensive and time consuming machining of metal parts or the like. This was not possible with known, non-planar worms since injection molding of non-planar worms induced burs and ridges on the worm which impaired the operation of the gear unit.

Another advantage of using a planar worm is that such a planar worm can, according to another advantageous example, be provided with at least one further gearing which is preferably provided on the first side face of the worm. In this way, the gearing ratio of the first gearing unit can be further increased since the worm includes a gearing ratio in itself. In this context, it is preferred that the first gear unit further comprises a drive gear meshing with the at least one further gearing of the worm.

According to another advantageous example the geodetic apparatus further comprises drive means, preferably a thumb wheel and/or a motor connected with the worm and/or the drive gear. In this way, a simple and direct operation and adjustment of the optical device can be achieved.

According to another advantageous example the geodetic apparatus further comprises a second support on which the optical device is supported such that the optical device may turn around a second axis, and a second gear unit for transmitting a drive torque on the optical device so as to turn the optical device around the second axis. As a result, the optical device can be adjusted into virtually any desired position by turning the optical device around two separate axes which are preferably perpendicular to each other.

BRIEF DESCRIPTION OF THE DRAWINGS

FIG. 3 is a perspective view illustrating a first embodiment of a gear unit in the geodetic apparatus shown in FIG. 1.

FIG. 4 is a perspective view illustrating a second embodiment of a gear unit in the geodetic apparatus shown in FIG. 1.

FIG. 5 is another perspective view illustrating the second embodiment of a gear unit in the geodetic apparatus shown in FIG. 1.

DETAILED DESCRIPTION OF SPECIFIC EMBODIMENTS

Preferred embodiments of the invention are described with reference to the figures. It is noted that the following description contains examples only and should not be construed as limiting the invention.

Figure 1:
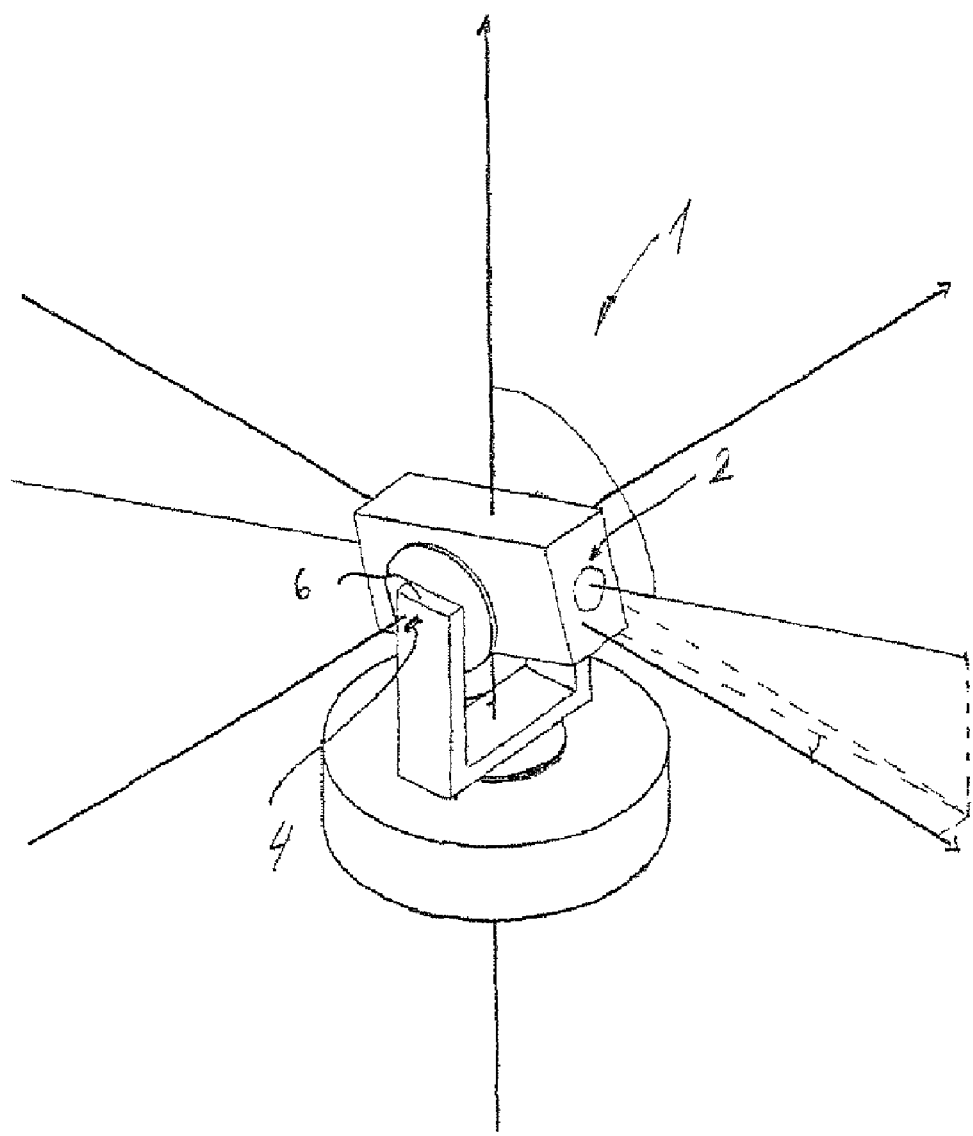
FIG. 1 is a strongly simplified perspective view illustrating a part of a geodetic apparatus according to an embodiment of the invention.

A strongly simplified perspective view of a geodetic apparatus according to an embodiment of the invention is schematically shown in FIG. 1. The geodetic apparatus generally comprises an optical device 2, for instance a telescope, for sighting objects. Thus, the geodetic apparatus 1 can be a tacheometer or theodolite which are used for sighting or focusing objects and for determining their (relative) position.

The optical device 2 is fixed on a shaft 4 which is supported on a base 6 in such a way that the optical device 2 may turn around a first axis X.

Figure 2:
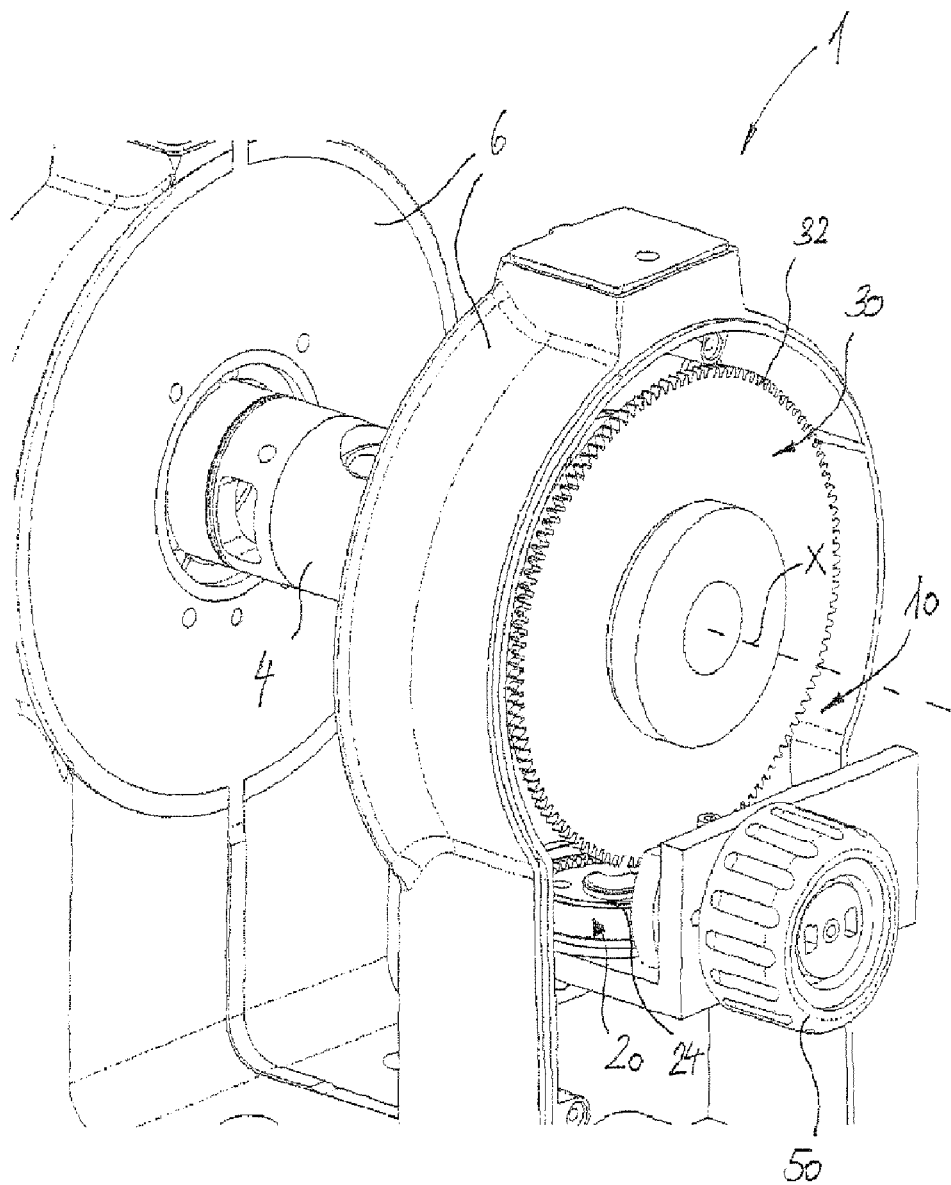
FIG. 2 is a perspective view illustrating a part of a geodetic apparatus according to an embodiment of the invention.

An adidate of a geodetic apparatus 1 according to a preferred embodiment of the invention is schematically shown in a perspective view in FIG. 2. For actuating and turning the optical device 2 around the first axis X, the geodetic apparatus 1 further comprises a thumb wheel 50 or other drive means such as a motor. The drive torque of the thumb wheel 50 is transmitted to the shaft 4 by means of a first gear unit 10.

A first embodiment of the first gear unit 10 is schematically shown in a partial view in FIG. 3. In this embodiment, the first gear unit 10 comprises a worm 20 and a worm gear 30 meshing with each other. The worm 20 has a plate like body 22. On a first side face 22' of the plate like body 22 a spirally extending worm thread 24 is formed in such a way that it extends in a single plane by about 720° along the outer periphery of the first side face 22'. In the present embodiment, the worm 20 is made of a plastic material by injection molding or another suitable process. Of course, the shape and material of the worm 20 is not limited on the described features but can varied in various ways.

As shown in FIG. 3, the first gear unit 10 further comprises a worm gear 30 which, in the present embodiment, is formed by a pinion gear. Further, it is to be noted that the teeth of the worm gear 30 may also be arranged along a circle on a side face of the worm gear 30 or even in inclined manner. In the present embodiment, the axis of rotation of the worm 20 and the worm gear 30 are perpendicular to each other. Even though not shown in FIG. 3, a thumb wheel or other drive means may be directly or indirectly connected to the worm 20 so as to transmit a drive torque to the shaft 4 in order to turn the optical device to around the first axis X.

Further, even though also not shown in the figures, a friction clutch or other suitable means may be arranged between the first gear unit 10 and the shaft 4 such that the optical device 2 may also be turned without actuating the first gear unit, for instance manually by gripping and turning the optical device 2 around the first axis X.

FIGS. 4 and 5 schematically show a second embodiment of the first gear unit 10 in the geodetic apparatus 1 according to the present invention. In FIGS. 4 and 5, same or corresponding components are designated with the same reference numerals, and a repeated discussion thereof is omitted.

As shown in FIGS. 4 and 5, the worm of the second embodiment comprises a further gearing 26 in the form of rack teeth which are arranged along a circle on the first side face 22' of the worm 20.

A drive gear 40, a pinion in this embodiment, meshes with the further gearing 26 of the worm and is fixed on a shaft 42 which is connected to the thumb wheel 50 or other suitable drive means. In this way, the reduction gear ratio of the first gear unit 10 can be further increased by maintaining a simple construction and easy manufacture.

What is claimed is:

1. A geodetic apparatus comprising:
an optical device for sighting objects,
a first support on which the optical device is supported such that the optical device may turn around a first axis, and
a first gear unit for transmitting a drive torque on the optical device so as to turn the optical device around the first axis, wherein
the first gear unit comprises a worm and a worm gear meshing with each other, wherein
the worm has a plate-like body and a spirally extending worm thread is formed on a first side face of the body, and the worm gear has a plurality of teeth evenly distributed along a circle.

2. The geodetic apparatus according to claim 1 wherein the axes of the worm and the worm gear are non-parallel.

3. The geodetic apparatus according to claim 2 wherein the axes of the worm and the worm gear are perpendicular to each other.

4. The geodetic apparatus according to claim 1 wherein the worm gear comprises a pinion gear.

5. The geodetic apparatus according to claim 1 wherein the worm thread of the worm extends in a single plane.

6. The geodetic apparatus according to claim 1 wherein the worm thread spirally extends by at least 360°.

7. The geodetic apparatus according to claim 1 wherein the worm is at least partially made of a plastic material.

8. The geodetic apparatus according to claim 7 wherein the plastic material comprises an injection molded element.

9. The geodetic apparatus according to claim 1 wherein the worm comprises at least one further gearing.

10. The geodetic apparatus according to claim 9 wherein the at least one further gearing is provided on the first side face of the worm.

11. The geodetic apparatus according to claim 9 wherein the first gear unit further comprises a drive gear meshing with the at least one further gearing of the worm.

12. The geodetic apparatus according to claim 11 further comprising drive means.

13. The geodetic apparatus according to claim 12 wherein the drive means comprises at least one of a thumb wheel or a motor connected with at least one of the worm or the drive gear.

14. The geodetic apparatus according to claim 13 wherein the drive means comprises both a thumb wheel and a motor.

15. The geodetic apparatus according to claim 13 wherein the motor is connected with the worm and the drive gear.

16. The geodetic apparatus according to claim 1 further comprising
a second support on which the optical device is supported such that the optical device may turn around a second axis, and
a second gear unit for transmitting a drive torque on the optical device so as to turn the optical device around the second axis.

17. The geodetic apparatus according to claim 1 wherein the geodetic apparatus comprises at least one of a tacheometer or a theodolite.

* * * * *